US010974673B2

(12) United States Patent
Hashimura et al.

(10) Patent No.: US 10,974,673 B2
(45) Date of Patent: Apr. 13, 2021

(54) VEHICULAR STRUCTURE

(71) Applicant: KOBE STEEL, LTD., Hyogo (JP)

(72) Inventors: Toru Hashimura, Kobe (JP); Ryohei Yukishige, Kobe (JP); Yasuhiro Maeda, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 98 days.

(21) Appl. No.: 16/495,299

(22) PCT Filed: Mar. 13, 2018

(86) PCT No.: PCT/JP2018/009770
§ 371 (c)(1),
(2) Date: Sep. 18, 2019

(87) PCT Pub. No.: WO2018/173859
PCT Pub. Date: Sep. 27, 2018

(65) Prior Publication Data
US 2021/0009058 A1     Jan. 14, 2021

(30) Foreign Application Priority Data

Mar. 24, 2017     (JP) .............................. JP2017-059794

(51) Int. Cl.
*B60R 19/34*     (2006.01)
*B60R 19/18*     (2006.01)
(Continued)

(52) U.S. Cl.
CPC ............ *B60R 19/18* (2013.01); *B60R 19/023* (2013.01); *B60R 19/24* (2013.01); *B60R 19/26* (2013.01);
(Continued)

(58) Field of Classification Search
CPC ............. B29C 66/71; B60G 2400/252; B60G 2600/26; B60G 2400/104; B60G 17/017;
(Continued)

(56) References Cited

U.S. PATENT DOCUMENTS 6,361,092 B1 *   3/2002   Eagle .................... B60R 19/18
                                                                188/371
9,650,075 B2 *   5/2017   Murayama .......... B62D 25/082
(Continued)

FOREIGN PATENT DOCUMENTS

JP       2002155981 A     5/2002
JP       2007284039 A    11/2007
(Continued)

OTHER PUBLICATIONS

International Preliminary Report on Patentability issued in corresponding International Application No. PCT/JP2018/009770; dated Oct. 3, 2019.
(Continued)

*Primary Examiner* — Kiran B Patel
(74) *Attorney, Agent, or Firm* — Studebaker & Brackett PC

(57) ABSTRACT

A vehicular structure includes: a first member formed in a tubular shape and having protrusions on an outer periphery thereof; and a second member formed in a tubular shape and having a locking wall with a hole in which the first member is inserted. The first member is joined to the second member such that a portion of the first member that is inserted in the hole of the second member is expanded, and the protrusions are in contact with the locking wall of the second member.

12 Claims, 10 Drawing Sheets

(51) Int. Cl.
*B60R 19/02* (2006.01)
*B60R 19/24* (2006.01)
*B60R 19/26* (2006.01)

(52) U.S. Cl.
CPC . *B60R 2019/182* (2013.01); *B60R 2019/1813* (2013.01)

(58) Field of Classification Search
CPC ......... B60R 19/34; B60R 19/18; B60R 19/24; B60R 2019/182; B60R 2019/1813
See application file for complete search history.

(56) References Cited

U.S. PATENT DOCUMENTS

| | | | |
|---|---|---|---|
| 10,870,403 B2* | 12/2020 | Lattorff | B60R 19/18 |
| 2002/0063433 A1 | 5/2002 | Gotanda et al. | |
| 2004/0169383 A1* | 9/2004 | Shimotsu | B60R 19/34 |
| | | | 293/133 |
| 2009/0243314 A1 | 10/2009 | Hashimoto et al. | |
| 2012/0025546 A1* | 2/2012 | Haneda | F16B 17/006 |
| | | | 293/132 |
| 2012/0267908 A1* | 10/2012 | Kokubo | B60R 19/34 |
| | | | 293/133 |
| 2013/0147233 A1* | 6/2013 | Miyashita | B60R 19/34 |
| | | | 296/187.1 |
| 2013/0320685 A1* | 12/2013 | Imamura | B60R 19/24 |
| | | | 293/155 |
| 2016/0101751 A1* | 4/2016 | Bou | B62D 21/152 |
| | | | 293/133 |
| 2016/0207573 A1* | 7/2016 | Kitakata | B60R 19/12 |
| 2017/0050598 A1* | 2/2017 | Taguchi | B62D 21/152 |
| 2017/0106909 A1* | 4/2017 | Daido | B60R 19/34 |
| 2018/0015527 A1 | 1/2018 | Maeda et al. | |
| 2018/0170294 A1* | 6/2018 | Hashimoto | B60R 19/34 |
| 2018/0272414 A1* | 9/2018 | Maeda | B21D 53/88 |
| 2019/0210088 A1 | 7/2019 | Maeda et al. | |
| 2019/0210089 A1 | 7/2019 | Maeda et al. | |
| 2019/0264769 A1* | 8/2019 | Gergely | F16F 7/003 |
| 2019/0375355 A1* | 12/2019 | Maeda | B21D 39/20 |
| 2019/0375356 A1* | 12/2019 | Yoshida | B62D 21/155 |
| 2020/0223384 A1* | 7/2020 | Kim | B60R 21/0136 |
| 2020/0377046 A1* | 12/2020 | Hashimura | B23P 19/02 |
| 2021/0016832 A1* | 1/2021 | Hashimura | B60R 19/24 |

FOREIGN PATENT DOCUMENTS

| | | |
|---|---|---|
| JP | 2009241869 A | 10/2009 |
| JP | 2010006193 A | 1/2010 |
| JP | 2016147309 A | 8/2016 |
| WO | 2017/056783 A1 | 4/2017 |

OTHER PUBLICATIONS

The extended European search report issued by the European Patent Office dated Oct. 5, 2020, which corresponds to European Patent Application No. 18770206.3-1132 and is related to U.S. Appl. No. 16/495,299.

* cited by examiner

VEHICULAR STRUCTURE

CROSS-REFERENCE TO RELATED APPLICATIONS

This is a national phase application in the United States of International Patent Application No. PCT/JP2018/9770 with an international filing date of Mar. 13, 2018, which claims priorities of Japanese Patent Applications No. 2017-059794 filed on Mar. 24, 2017 the contents of which are incorporated herein by reference.

TECHNICAL FIELD

The present disclosure relates to a vehicular

BACKGROUND ART

A metal called high-tensile-strength steel, which has a low specific gravity and exhibits high strength, is used to reduce weight and to improve safety of vehicles. Using such high-tensile-strength steel is effective for weight reduction and safety improvement of vehicles, but the effect of weight reduction is limited as compared with materials of further low specific gravity, such as aluminum alloy. In addition, using high-tensile-strength steel causes problems due to its high strength, such as decrease in formability, increase in forming load, decrease in dimensional accuracy, and decrease in rigidity involved by thinning. In recent years, extruded materials, cast products, and press-formed products of aluminum alloy, which has a lower specific gravity than steel, have been used for vehicle parts to solve the above problems. Aluminum alloy has a low specific gravity and thus is effective for reducing weight of vehicles, but is lower in strength and higher in price than high-tensile-strength steel. Therefore, multi-materialization is being promoted by using steel parts, such as high-tensile-strength steel parts, in combination with aluminum alloy parts.

In such multi-materialization, an important issue is to join dissimilar metals together, such as steel parts and aluminum alloy parts. For example, JP 2016-147309 A discloses a method of joining members that enables joining of dissimilar metals in multi-materialization by utilizing an elastic body. Specifically, in the method of joining members of JP 2016-147309 A, an aluminum pipe is inserted into a hole of a steel part, and a rubber member (an elastic body) that has been inserted inside the aluminum pipe is applied with a pressure to be deformed. Thereby, the aluminum pipe is enlarged and deformed, so that the steel part and the aluminum pipe are crimped together.

SUMMARY OT THE INVENTION

Problems to be Solved by the Invention

However, according to the method of joining members of JP 2016-147309 A, the joining strength between the members is weak as compared with joining by welding or bolt fastening. For this reason, when a force in the direction of the central axis of the aluminum pipe is applied, the joint between the steel part and the aluminum pipe may be released, and the aluminum pipe may penetrate the steel part. For example, when this joining method is applied to a bumper reinforcement of a vehicle, the possibility of such penetration increases when a strong collision force is applied from the front of the vehicle.

Embodiments of the present invention have been made in view of the above circumstances, and an object thereof is to provide a vehicular structure including a first member and a second member joined together that can prevent the first member from penetrating the second member when a load is applied in an axial direction of the first member.

Means for Solving the Problems

A vehicular structure according to an embodiment of the present invention includes: a first member formed in a tubular shape and having a protrusion on an outer periphery thereof; and a second member formed in a tubular shape and having a locking wall with a hole in which the first member is inserted. The first member is expanded at a portion thereof inserted in the hole of the second member and joined to the second member, and the protrusion is in contact with the locking wall of the second member.

According to this configuration, when a load in an axial direction of the first member is applied, the protrusion comes into contact with the locking wall of the second member to support part of the load, thereby reducing the load acting on a joint portion where the first member is joined to the second member. Accordingly, the joining strength between the first member and the second member with respect to the load in the axial direction of the first member can be enhanced, thereby preventing the joint portion between the first member and the second member from being released. As a result, the first member can be prevented from penetrating the second member.

The hole may penetrate the locking wall in a direction intersecting a longitudinal direction of the second member, and the protrusion may protrude in the longitudinal direction.

According to this configuration, when a load in the longitudinal direction of the second member is applied, the protrusion comes into contact with the locking wall of the second member to support part of the load applied to the joint portion, thereby reducing the load acting on the joint portion. Accordingly, the joining strength between the first member and the second member with respect to the load in the longitudinal direction of the second member can be enhanced, thereby preventing the joint portion between the first member and the second member from being released. As a result, the first member is prevented from falling toward the second member when a power in the longitudinal direction of the second member is applied.

The protrusion may extend in an axial direction of the first member.

A protruded amount of the protrusion may have distribution in the axial direction of the first member of the protrusion.

This configuration achieves weight reduction by partially reducing the protruded amount of the protrusion or by partially not causing the protrusion to protrude. In addition, this configuration reduces the crushing strength of the first member against a force in the axial direction of the first member while preventing the first member from penetrating the second member, thereby enhancing an absorption capacity for collision energy of the vehicular structure.

The first member may be a bumper stay for a vehicle, and the second member may be a bumper beam for a vehicle.

Each of the first member and the second member may be made of an aluminum material.

Here, the aluminum material refers to pure aluminum or an aluminum alloy.

A material of the first member may be different from a material of the second member.

The first member may be made of an aluminum material, and the second member may be made of a steel material.

According to embodiments of the present invention, a vehicular structure including a first member and a second member can prevent the first member from penetrating the second member when a load in a longitudinal direction of the first member is applied to the vehicular structure.

DESCRIPTION OF EMBODIMENTS

First Embodiment

A vehicular structure according to a first embodiment of the present invention will be described with reference to FIGS. 1 to 3. The following description uses the terms that indicate particular directions or positions as needed (for example, terms including "upper", "lower", "horizontal", "front", "rear", "side", "end") to facilitate understanding of the invention with reference to the drawings, but the technical scope of the present invention should not be limited by the meaning of these terms. That is, these terms simply indicate directions of a posture of the vehicular structure shown in the attached drawings, and do not necessarily coincide with the directions in an actual use state. In addition, the following descriptions are essentially mere examples, and are not intended to limit the present invention, applied products or applications of the invention.

The following description refers to a width direction of a vehicle as an X-direction, a longitudinal direction of the vehicle as a Y-direction, and a vertical direction of the vehicle as a Z-direction.

Figure 1:
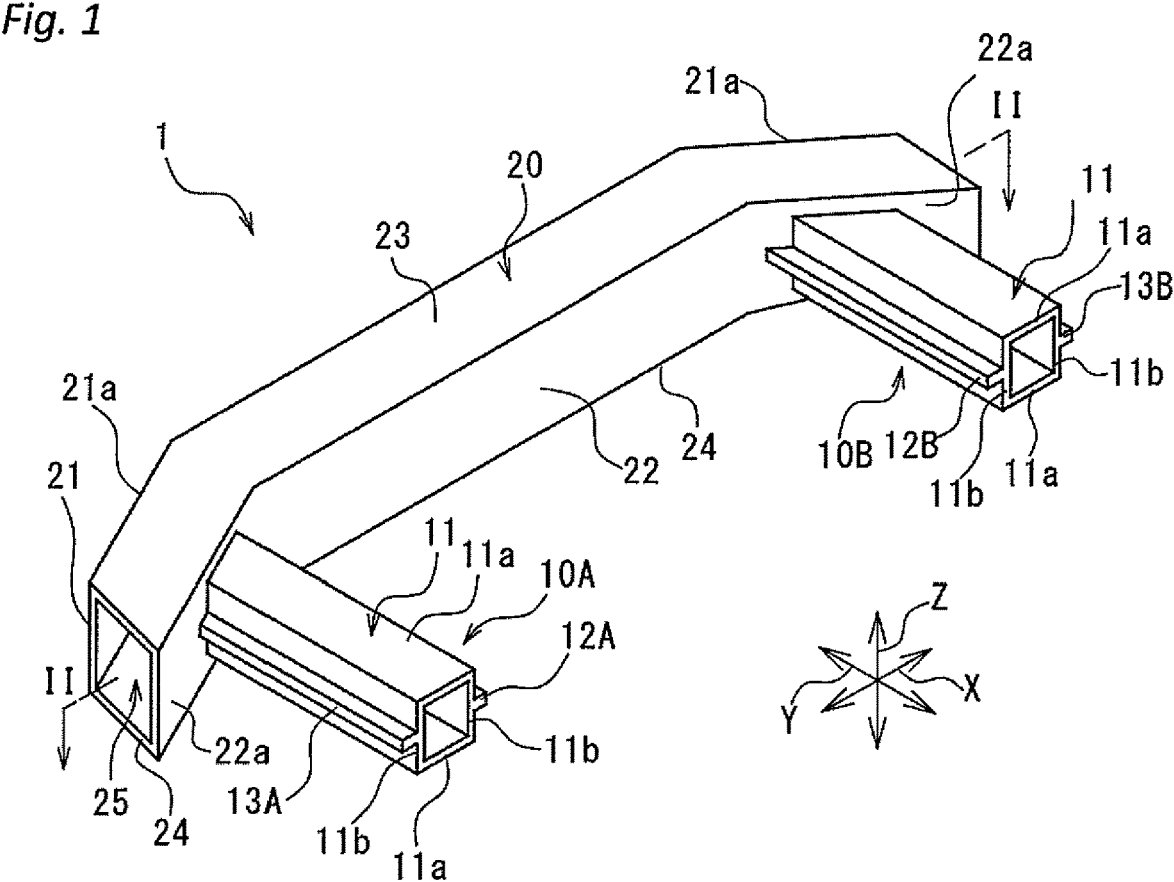
FIG. 1 is a schematic perspective view of a vehicular structure according to a first embodiment of the present invention.

Referring to FIG. 1, a bumper reinforcement (vehicular structure) 1 according to the present embodiment includes a pair of bumper stays (first members) 10A, 10B and one bumper beam (second member) 20.

Each of the bumper stays 10A, 10B is a tubular member extending in the Y-direction. Referring also to FIG. 2, each of the bumper stays 10A, 10B has a flat surface perpendicular to a longitudinal direction of the bumper stays 10A, 10B at one end 10a thereof that is mechanically connected to a vehicle skeleton (not shown). Each of the bumper stays 10A, 10B is cut off according to the shape of the bumper beam 20 at the other end 10b thereof that is mechanically connected to the bumper beam 20. Referring also to FIG. 3, each the bumper stays 10A, 10B includes an outer wall unit 11 having a rectangular outer shape with a closed section in a plane perpendicular to the Y-direction (XZ-plane). The outer wall unit 11 has a pair of horizontal walls 11a extending in the X-direction and a pair of vertical walls 11b extending in the Z-direction such that each of the vertical walls 11b mechanically connects edges of the pair of horizontal walls 11a. The bumper stays 10A, 10B respectively include inward protrusions 12A, 12B, each of which is disposed on one of the pair of vertical walls 11b of the outer wall unit 11 of one of the bumper stays 10A, 10B, the vertical wall 11b facing the other one of the bumper stays 10A, 10B. The inward protrusions 12A, 12B protrude respectively from substantially middle portions of the individual vertical walls 11b in the Z-direction toward the inside of the vehicle. The bumper stays 10A, 10B respectively include outward protrusions 13A, 13B each of which is disposed on one of the pair of vertical walls 11b of the outer wall unit 11 of one of the bumper stays 10A, 10B, the vertical wall 11b not facing the other one of the bumper stays 10A, 10B. The outward protrusions 13A, 13B protrude respectively from substantially middle portions of the individual vertical walls 11b in the Z-direction toward the outside of the vehicle. Each of the inward protrusions 12A, 12B and the outward protrusions 13A, 13B according to the present embodiment has a thickness substantially the same as the thickness of the outer wall unit 11, and has an amount of protrusion approximately twice the thickness of the outer wall unit. Referring to FIG. 2, each of the bumper stays 10A, 10B includes a swelling portion 14 at which the outer wall unit 11 swells outward from its individual one of the bumper stays 10A, 10B. Such bumper stays 10A, 10B may be formed of an aluminum alloy extruded material, for example.

Figure 2:
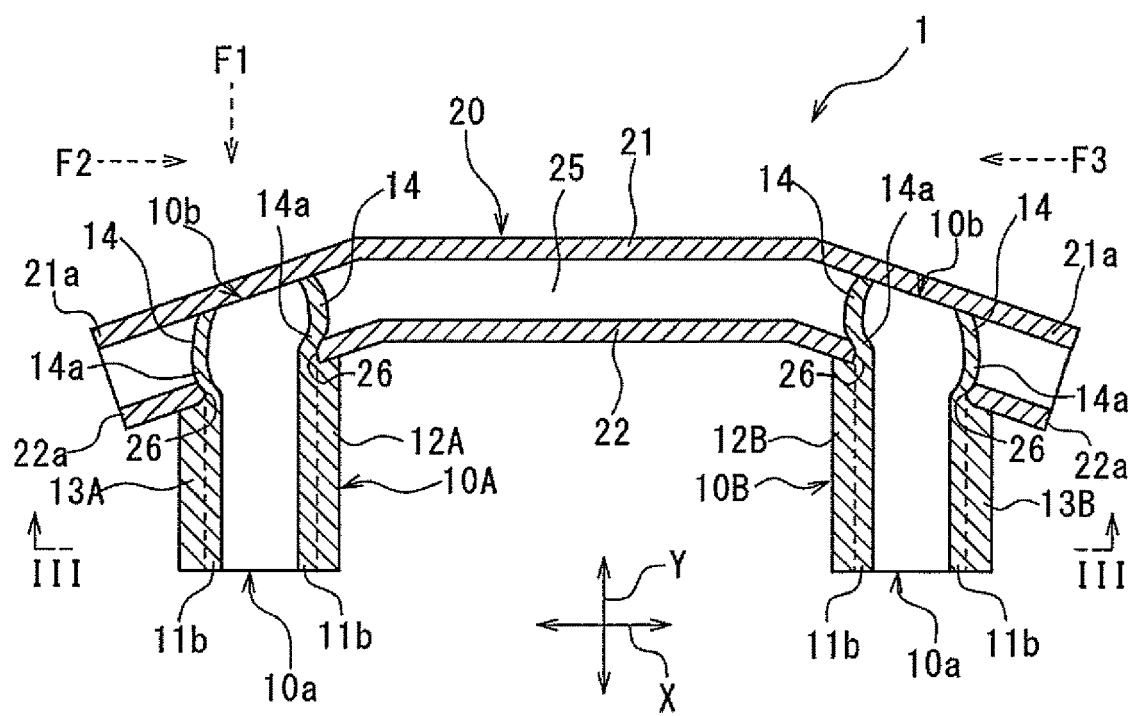
FIG. 2 is a sectional view of the vehicular structure taken along the line in FIG. 1.
Figure 3:
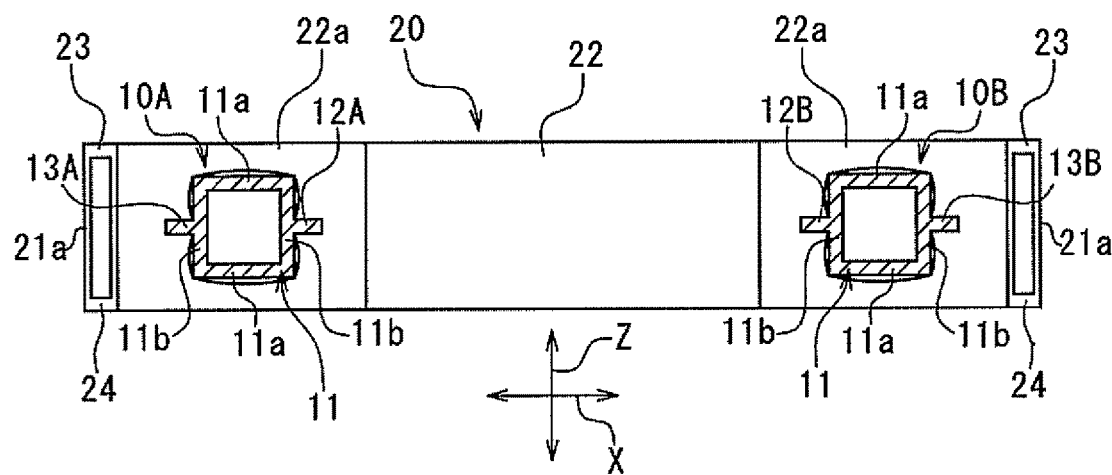
FIG. 3 is a sectional view of the vehicular structure taken along the line in FIG. 2.

Referring to FIGS. 1 and 2, the bumper beam 20 is disposed in front of the bumper stays 10A 10B in the Y-direction. The bumper beam 20 includes a front wall 21 disposed in the XZ-plane, and a rear wall 22 disposed in the XZ-plane and rearward in the Y-direction apart from the front wall 21. Either end of the front wall 21 has a front inclined-portion 21a extending toward the outside of the vehicle and inclined rearward in the Y-direction when viewed from the Z-direction. Either end of the rear wall 22 has a rear inclined-portion (locking wall) 22a extending toward the outside of the vehicle and inclined rearward in the Y-direction when viewed from the Z-direction. The bumper beam 20 includes an upper wall 23 and a lower wall 24 each of which is disposed in a plane perpendicular to the Z-direction (XY-plane) and mechanically connects an edge of the front wall 21 with an edge of the rear wall 22. That is, the bumper beam 20 according to the present embodiment is a tubular member that has a space 25 surrounded by the front wall 21, the rear wall 22, the upper wall 23, and the lower wall 24, and both ends of which are inclined. Each of the rear inclined-portions 22a has a hole 26 in which the outer wall unit 11 of a corresponding one of the bumper stays 10A, 10B is inserted. The hole 26 has a rectangular shape similar to the outer shape of the outer wall unit 11 of each of the bumper stays 10A, 10B, and is slightly larger than the outer shape of the outer wall unit 11. Such a bumper beam 20 may be formed of, for example, a high-tensile-strength steel.

Referring to FIG. 2, the swelling portion 14 of each of the bumper stays 10A, 10B is located in the space 25 of the bumper beam 20, and is in contact with the entire periphery of the hole 26 at an end 14a thereof.

The inward protrusions 12A, 12B and the outward protrusions 13A, 13B of the bumper stays 10A, 10B are in contact with a corresponding one of the rear inclined-portions 22a of the rear wall 22 from the rear side in the Y-direction.

A method of forming a bumper reinforcement 1 according to the present embodiment will be described with reference to FIGS. 4 to 6.

Figure 4:
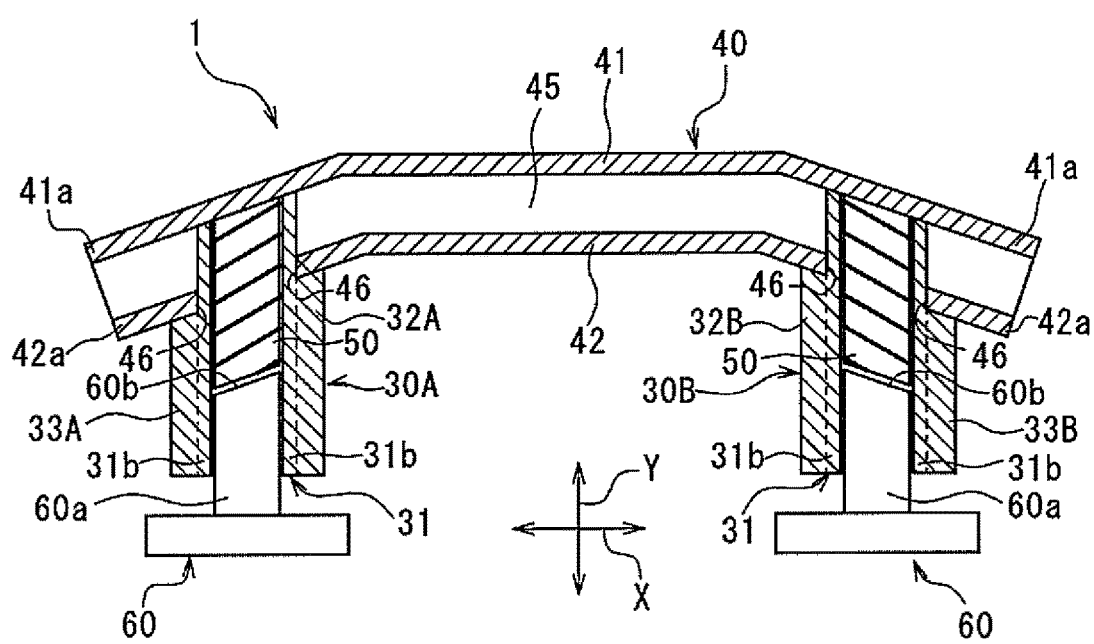
FIG. 4 is a sectional view taken in the same manner as FIG. 2 illustrating a first step of joining members according to the first embodiment.

As shown in FIG. 4, first structural members 30A, 30B are respectively used to form the bumper stays 10A, 10B, and the second structural member 40 is used to form the bumper beam 20. The first structural members 30A, 30B are joined with the second structural member 40 by using rubber members 50 (elastic bodies) respectively inserted in the first structural members 30A, 30B, and by using pressers 60 for compressing the respective rubber members 50.

Each of the first structural members 30A, 30B includes an outer wall unit 31 having a rectangular outer shape with a closed section in the XZ-plane. The outer wall unit 31 has a pair of horizontal walls (not shown) extending in the X-direction and a pair of vertical walls 31b extending in the Z-direction such that each of the vertical walls 31b mechanically connects edges of the pair of horizontal walls. The first structural members 30A, 30B respectively include inward protrusions 32A, 32B, each of which is disposed on one of the pair of vertical walls 31b of the outer wall unit 31 of one of the first structural members 30A, 30B, the vertical wall 31b facing the other one of the first structural members 30A, 30B. The inward protrusions 32A, 32B protrude respectively from substantially middle portions of the individual vertical walls 31b in the Z-direction toward the inside of the vehicle. The first structural members 30A, 30B respectively include outward protrusions 33A, 33B, each of which is disposed on one of the pair of vertical walls 31b of the outer wall unit 31 of one of the first structural members 30A, 30B, the vertical wall 31b not facing the other one of the first structural members 30A, 30B. The outward protrusions 33A, 33B protrude respectively from substantially middle portions in the Z-direction of the individual vertical walls 31b toward the outside of the vehicle.

The second structural member 40 includes a front wall 41 disposed in the XZ-plane, and a rear wall 42 disposed in the XZ-plane and rearward in the Y-direction apart from the front wall 41. Either end of the front wall 41 has a front inclined-portion 41a extending toward the outside of the vehicle and inclined rearward in the Y-direction when viewed from the Z-direction. Either end of the rear wall 42 has a rear inclined-portion 42a extending toward the outside of the vehicle and inclined rearward in the Y-direction when viewed from the Z-direction. The second structural member 40 includes an upper wall and a lower wall (not shown) each of which is disposed in the XY-plane and mechanically connects an edge of the front wall 41 with an edge of the rear wall 42. That is, the second structural member 40 according to the present embodiment is a tubular member that has a space 45 surrounded by the front wall 41, the rear wall 42, the upper wall, and the lower wall, and both ends of which are inclined. Each of the rear inclined-portions 42a has a hole 46 in which the outer wall unit 31 of a corresponding one of the first structural member 30A, 30B is inserted. The hole 46 has a rectangular shape similar to the outer shape of the outer wall unit 31 of each of the first structural members 30A, 30B, and is slightly larger than the outer shape of the outer wall unit 31.

Each of the rubber members 50 has a shape of a quadrangular prism extending in the Y-direction. The outer shape of each rubber member 50 is slightly smaller than the inner shape of each of the first structural members 30A, 30B such that the rubber members 50 can be inserted in the first structural members 30A, 30B respectively. Either end of each rubber member 50 has a flat surface inclined with respect to the longitudinal direction of the rubber members 50 corresponding to the shape of the second structural member 40. A material of the rubber members 50 is preferably urethane rubber, chloroprene rubber, CNR (rubber formed of chloroprene rubber and nitrile rubber), or silicone rubber, for example. The hardness of the rubber members 50 is preferably 30 or more in Shore A.

The pressers 60 are attached to a press device or the like (not shown), and are configured to compress the rubber members 50 respectively in the Y-direction by being driven by the press device. Each of the pressers 60 has a projection 60a. The projection 60a is a part to press a corresponding one of the rubber members 50. A pressing surface 60b, which is an end surface of the projection 60a, has a flat surface inclined with respect to the longitudinal direction of the rubber members 50 corresponding to the shape of each rubber member 50.

First, as shown in FIG. 4, the first structural members 30A, 30B are respectively inserted in the holes 46 provided in the rear inclined-portions 42a until the inward protrusions 32A, 32B and the outward protrusions 33A, 33B come into contact with the respective rear inclined-portions 42a of the rear wall 42 of the second structural member 40. Then, the rubber members 50 are respectively inserted in the first structural members 30A, 30B.

Figure 5:
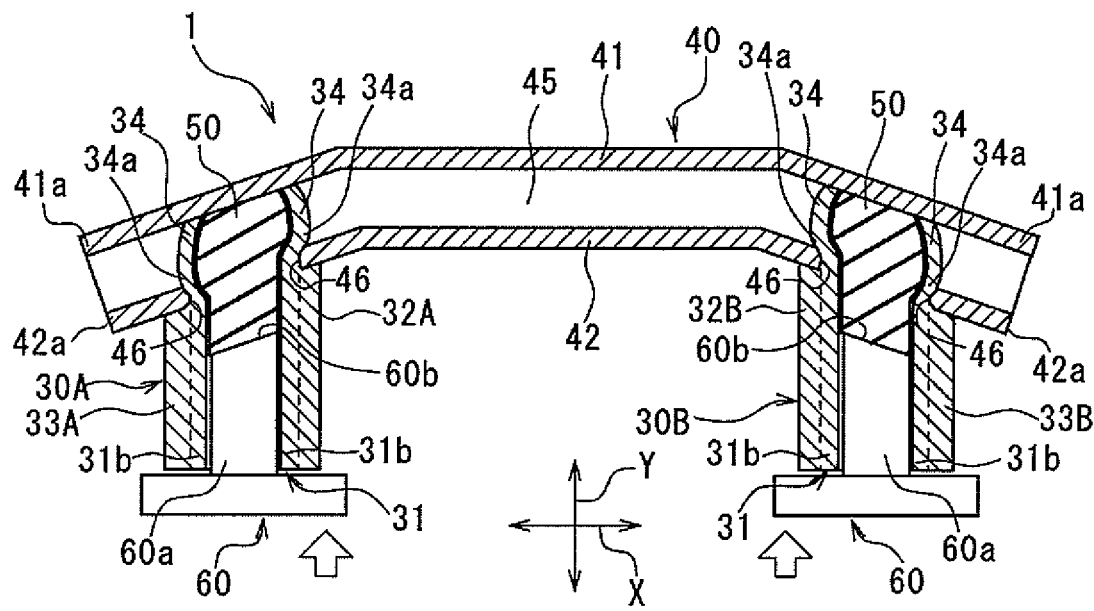
FIG. 5 is a sectional view taken in the same manner as FIG. 2 illustrating a second step of joining the members according to the first embodiment.

Next, as shown in FIG. 5, the projections 60a of the pressers 60 are respectively inserted in the first structural members 30A, 30B to compress the rubber members 50 in the Y-direction to cause the rubber members 50 to swell in a direction orthogonal to the compression direction, thereby expanding the first structural members 30A, 30B. The first structural members 30A, 30B are thus expanded and crimped to the second structural member 40. Each of the first structural members 30A, 30B includes a swelling portion 34 disposed in an internal space 45 of the second structural member 40. An end 34a of the swelling portion 34 is prevented from being deformed due to a corresponding one of the holes 46 of the second structural member 40. The outer wall units 31 of the first structural members 30A, 30B are prevented from being deformed at portions provided with the inward protrusions 32A, 32B and the outward protrusions 33A, 33B, due to the presence of the inward protrusions 32A, 32B and the outward protrusions 33A, 33B.

Figure 6:
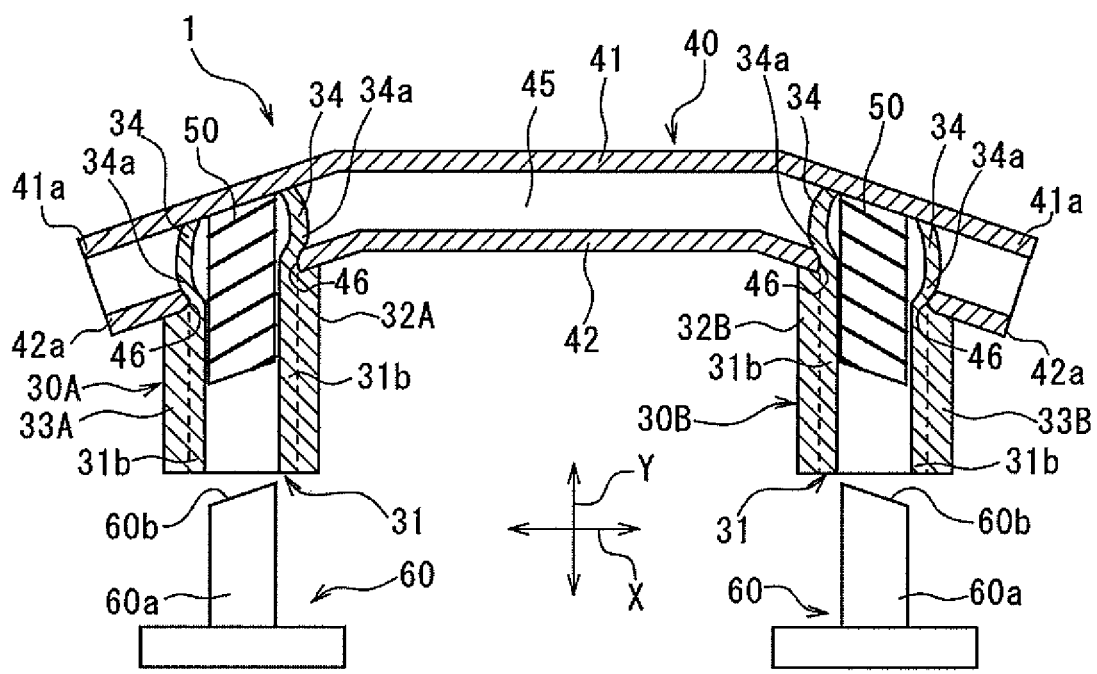
FIG. 6 is a sectional view taken in the same manner as FIG. 2 illustrating a third step of joining the members according to the first embodiment.

After the first structural members 30A, 30B are crimped to the second structural member 40, compression by the pressers 60 is released as shown in FIG. 6. The rubber members 50 that have been released from a compression force are restored to their original shapes by their own elasticity. Therefore, the rubber members 50 can be easily removed from the first structural members 30A, 30B.

The bumper reinforcement 1 of the present embodiment has the following features.

Each of the end surfaces of the inward protrusions 12A, 12B and the end surfaces of the outward protrusions 13A, 13B is provided at a level one step lower than that of the end surfaces of the bumper stays 10A, 10B. Therefore, when the outer wall units 11 of the bumper stays 10A, 10B are respectively inserted in the holes 26 of the bumper beam 20, the inward protrusions 12A, 12B and the outward protrusions 13A, 13B are not inserted therein and are configured to come into contact with the rear inclined-portions 22a from the rear side in the Y-direction. Therefore, in the case where a force is applied to the bumper reinforcement 1 from the front side in the Y-direction (see the broken arrow F1 in FIG. 2), the inward protrusions 12A, 12B and the outward protrusions 13A, 13B come into contact with the rear inclined-portions 22a to support part of the force, thereby reducing the force acting on the joint portions. This can enhance the joining strength between the bumper stays 10A, 10B and the bumper beam 20 with respect to a force in the Y-direction, thereby preventing the joint portions between the bumper stays 10A, 10B and the bumper beam 20 from being released. As a result, the bumper stays 10A, 10B can be prevented from penetrating the bumper beam 20.

In addition, in the case where a force in the X-direction is applied to the bumper reinforcement 1, the inward protrusions 12A, 12B and the outward protrusions 13A, 13B come into contact with the rear inclined-portions 22a to support part of the force, thereby reducing the force acting on the joint portions. For example, in the case where a force in the X-direction (see the dashed arrow F2) is applied by an offset collision to the left front inclined-portion 21a in FIG. 2, the outward protrusions 13A and the inward protrusion 12B come into contact with the rear inclined-portions 22a to support part of the force, thereby reducing the force acting on the joint portions. Similarly, in the case where a force in the X-direction (see the dashed arrow F3) is applied by an offset collision to the right front inclined-portion 21a in FIG. 2, the inward protrusions 12A and the outward protrusion 13B come into contact with the rear inclined-portions 22a to support part of the force, thereby reducing the force applied to the joint portions. This can enhance the joining strength between the bumper stays 10A, 10B and the bumper beam 20 with respect to a force in the X-direction, thereby preventing the joint portions between the bumper stays 10A, 10B and the bumper beam 20 from being released. As a result, the bumper stays 10A, 10B and the bumper beam 20 can be prevented from falling in the X-direction.

Furthermore, according to the present embodiment, in the case where a collision force in the Y-direction is applied to the bumper reinforcement 1, the bumper stays 10A, 10B can be prevented from penetrating the bumper beam 20 as described above, so that the bumper stays 10A, 10B are crushed in a collision. The crush of the bumper stays 10A, 10B absorbs the energy of the collision, so that the collision force can be distributed before reaching the cabin, and thus a driver can be protected safely. Further, in the case where a collision force in the X-direction is applied to the bumper reinforcement 1, the bumper stays 10A, 10B and the bumper beam 20 can be prevented from falling (falling sideways) as described above, which maintains an absorption capacity for collision energy of the bumper reinforcement 1. The bumper reinforcement 1 has been exemplified as an application of the present invention as described above, but the present invention can be applied to any vehicular structure that includes an expanded-tube joint, as well as the bumper reinforcement 1.

Hereinafter, modifications of the bumper reinforcement 1 according to the present embodiment will be described with reference to FIGS. 7 to 12.

Figure 7:
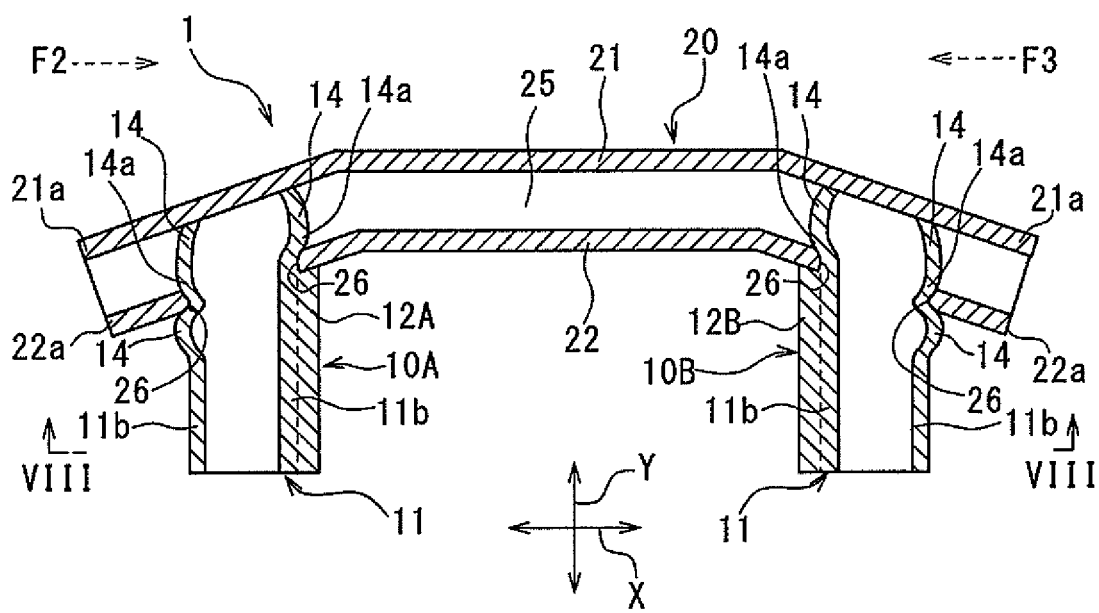
FIG. 7 is a sectional view taken in the same manner as FIG. 2 illustrating a first modification of the first embodiment.
Figure 8:
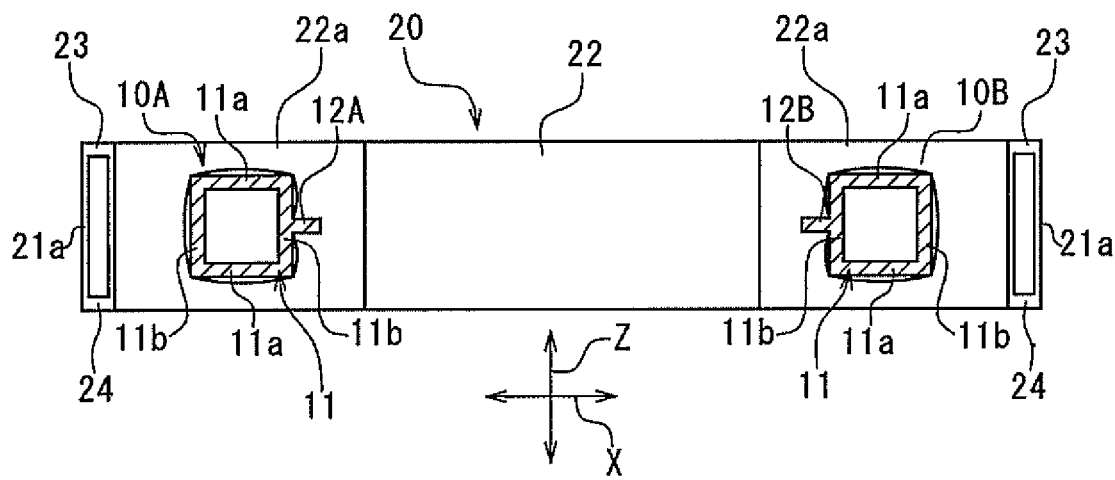
FIG. 8 is a sectional view of the vehicular structure taken along the line VIII-VIII in FIG. 7.

FIGS. 7 and 8 show a first modification in which the bumper stays 10A, 10B respectively include inward protrusions 12A, 12B. Each of the bumper stays 10A, 10B includes swelling portions 14 at portions of the pair of vertical walls 11b where the inward protrusions 12A, 12b are not provided, in the outer wall unit 11 of each of the bumper stays 10A, 10B.

In the case where a force in the X-direction is applied to the bumper reinforcement 1, the inward protrusions 12A, 12B come into contact with the rear inclined-portions 22a to support part of the force, thereby reducing the force acting on the joint portions. For example, in the case where a force in the X-direction (see the dashed arrow F2) is applied by an offset collision to the left front inclined-portion 21a in FIG. 7, the inward protrusion 12B comes into contact with a corresponding one of the rear inclined-portions 22a to support part of the force, thereby reducing the force acting on the joint portions. Similarly, in the case where a force in the X-direction (see the dashed arrow F3) is applied by an offset collision to the right front inclined-portion 21a in FIG. 7, the inward protrusion 12A comes into contact with a corresponding one of the rear inclined-portions 22a to support part of the force, thereby reducing the force applied to the joint portions. This can enhance the joining strength between the bumper stays 10A, 10B and the bumper beam 20 with respect to a force in the X-direction, thereby preventing the joint portions between the bumper stays 10A, 10B and the bumper beam 20 from being released. As a result, the bumper stays 10A, 10B and the bumper beam 20 can be prevented from falling in the X-direction.

Figure 9:
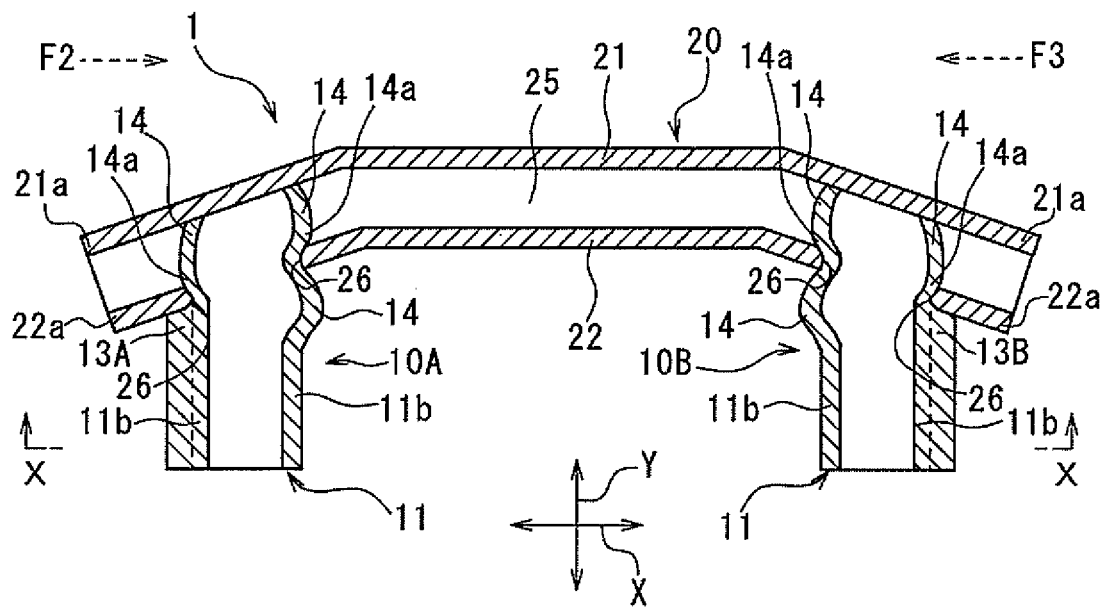
FIG. 9 is a sectional view taken in the same manner as FIG. 2 illustrating a second modification of the first embodiment.
Figure 10:
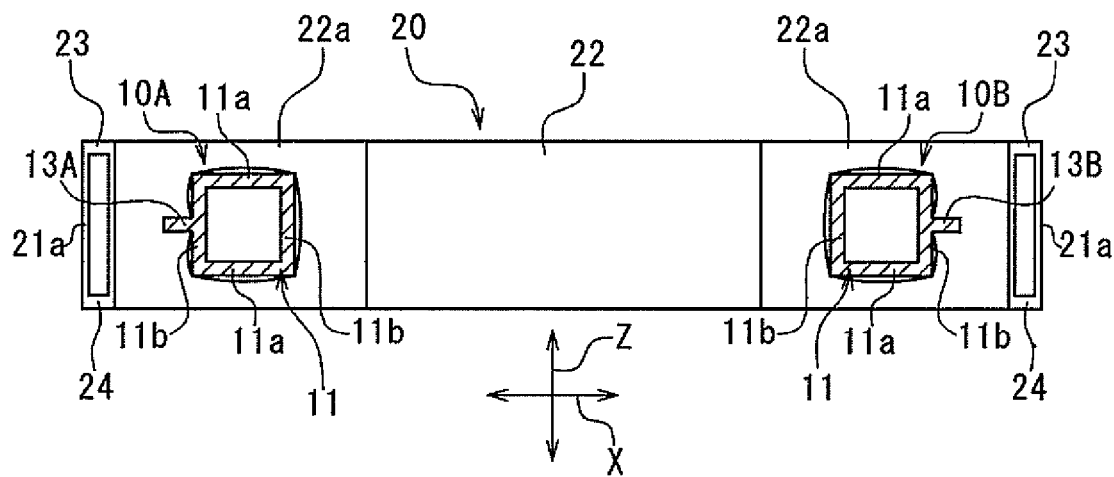
FIG. 10 is a sectional view of the vehicular structure taken along the line X-X in FIG. 9.

FIGS. 9 and 10 shows a second modification in which the bumper stays 10A, 10B respectively include outward protrusions 13A, 13B. Each of the bumper stays 10A, 10B includes swelling portions 14 at portions of the pair of vertical walls 11b where the outward protrusions 13A, 13B are not provided, in the outer wall unit 11 of each of the bumper stays 10A, 10B.

In the case where a force in the X-direction is applied to the bumper reinforcement 1, the outward protrusions 13A, 13B come into contact with the rear inclined-portions 22a to support part of the force, thereby reducing the force acting on the joint portions. For example, in the case where a force in the X-direction (see the dashed arrow F2) is applied by an offset collision to the left front inclined-portion 21a in FIG. 9, the outward protrusion 13A comes into contact with a corresponding one of the rear inclined-portions 22a to support part of the force, thereby reducing the force acting on the joint portions. Similarly, in the case where a force in the X-direction (see the dashed arrow F3) is applied by an offset collision to the right front inclined-portion 21a in FIG. 9, the outward protrusion 13B comes into contact with a corresponding one of the rear inclined-portions 22a to support part of the force, thereby reducing the force acting on the joint portions. This can enhance the joining strength between the bumper stays 10A, 10B and the bumper beam 20 with respect to a force in the X-direction, thereby preventing the joint portions between the bumper stays 10A, 10B and the bumper beam 20 from being released. As a result, the bumper stays 10A, 10B and the bumper beam 20 can be prevented from falling in the X-direction.

Figure 11:
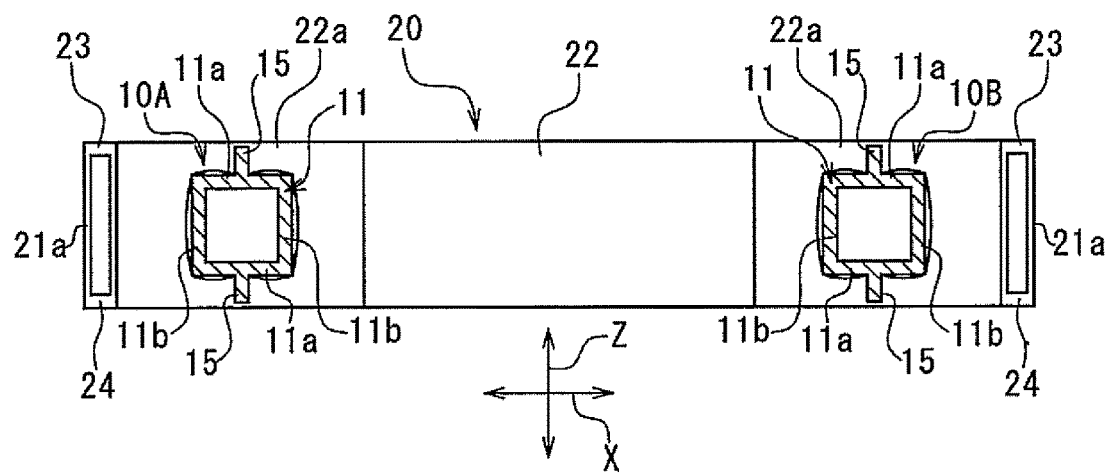
FIG. 11 is a sectional view taken in the same manner as FIG. 3 illustrating a third modification of the first embodiment.

FIG. 11 shows a third modification in which each of the bumper stays 10A, 10B includes a pair of vertical protrusions 15. Each vertical protrusion 15 protrudes in the Z-direction from a substantially middle portion in the X-direction of one of the pair of horizontal walls 11a.

Figure 12:
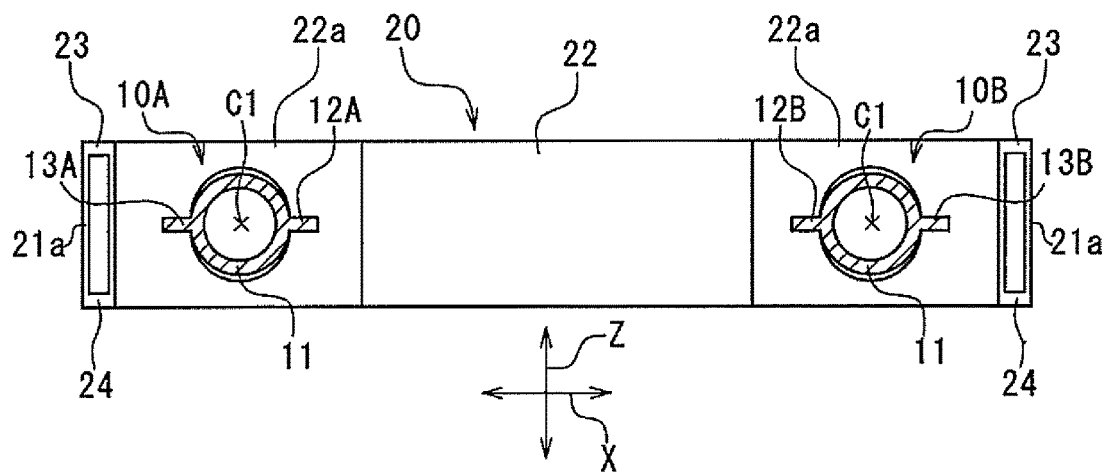
FIG. 12 is a sectional view taken in the same manner as FIG. 3 illustrating a fourth modification of the first embodiment.

FIG. 12 shows a fourth modification in which each of the bumper stays 10A, 10B includes an outer wall unit 11 having a circular outer shape with a closed section in the XZ-plane. The outer wall unit 11 has an axial center C1 extending in the Y-direction. The bumper stays 10A, 10B respectively include inward protrusions 12A, 12B each of which projects inwardly of the vehicle from a portion of the outer wall unit 11 disposed inwardly of the vehicle from the axial center C1. The bumper stays 10A, 10B respectively include outward protrusions 13A, 13B each of which project is outwardly of the vehicle from a portion of the outer wall unit 11 disposed outwardly of the vehicle from the axial center C1. The inward protrusions 12A, 12B, the outward protrusions 13A, 13B, and the axial center C1 are arranged at the same level in the Z-direction.

In the second and the third embodiments described below, the same or similar elements as or to those of the first embodiment are denoted by the same reference numerals, and the detailed description thereof is omitted. Furthermore, in these embodiments, the same effects as in the first embodiment are exerted except for the points specifically mentioned.

Second Embodiment

A second embodiment of the present invention will be described with reference to FIGS. 13 and 14.

Figure 13:
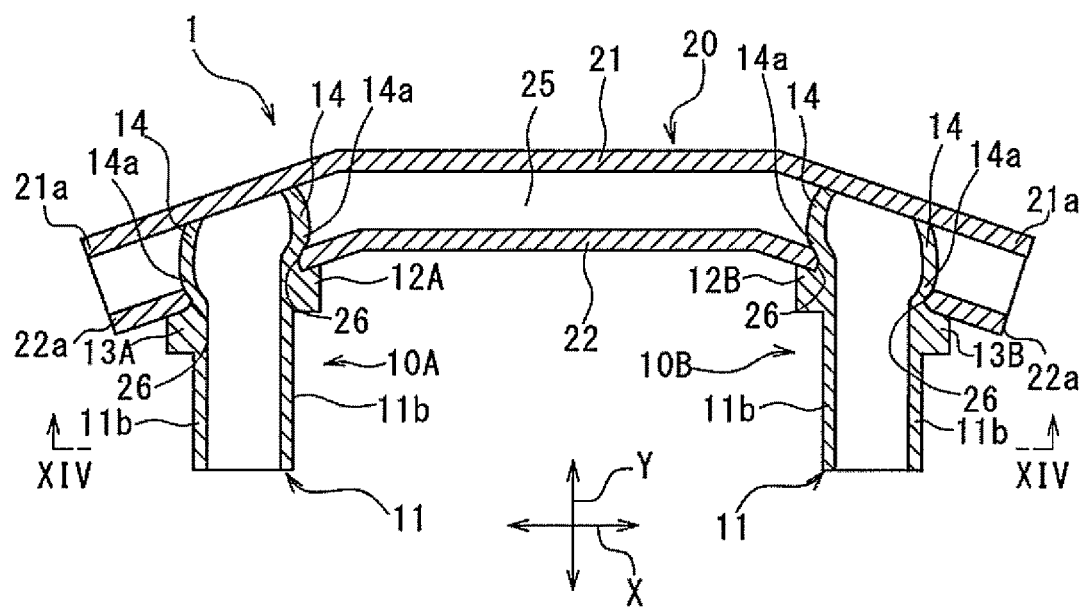
FIG. 13 is a sectional view of a vehicular structure according to a second embodiment of the present invention, taken in the same manner as FIG. 2.
Figure 14:
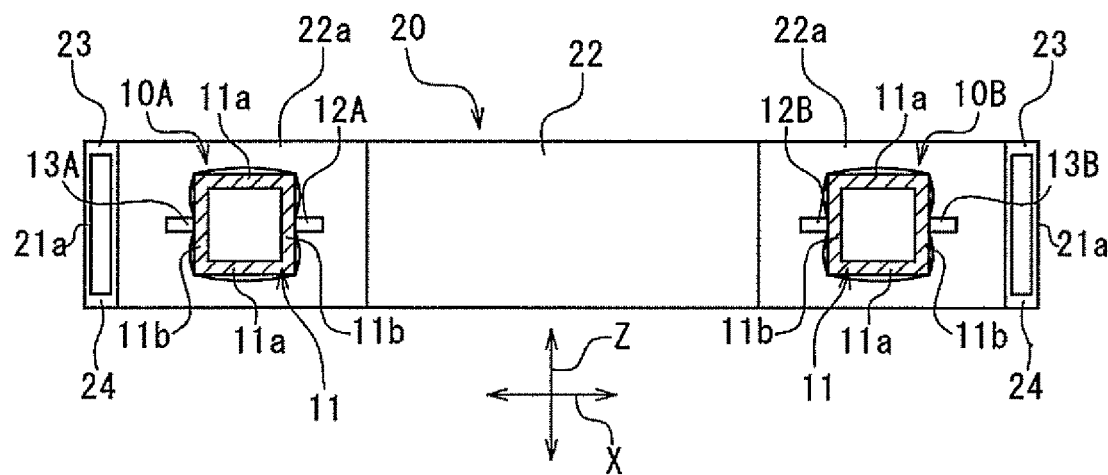
FIG. 14 is a sectional view of the vehicular structure taken along line XIV-XIV of FIG. 13.

With reference to FIGS. 13 and 14, the bumper stays 10A, 10B of the present embodiment have inward protrusions 12A, 12B and outward protrusions 13A, 13B, respectively. According to the present embodiment, the amounts of protrusion of the inward protrusions 12A and 12B and the outward protrusions 13A, 13B have distribution in the Y-direction. Specifically, the bumper stays 10A, 10B respectively have the inward protrusions 12A, 12B and the outward protrusions 13A, 13B in the Y-direction near the contact portions where the bumper stays 10A, 10B are in contact with the bumper beam 20, but do not have the inward protrusions 12A, 12B or the outward protrusions 13A, 13B at the other portions.

According to the present embodiment, the bumper stays 10A, 10B can be reduced in weight because of the portions without the inward protrusions 12A, 12B or the outward protrusions 13A, 13B. The portions have a lower strength against a force in the Y-direction than the portions with the inward protrusions 12A, 12B and the outward protrusions 13A, 13B. Therefore, the bumper stays 10A, 10B are easily crushed against a force in the Y-direction while preventing the bumper stays 10A, 10B from penetrating the bumper beam 20. As a result, an absorption capacity for collision energy of the bumper stays 10A, 10B can be enhanced.

Hereinafter, modifications of the present embodiment will be described with reference to FIGS. 15 and 16.

Figure 15:
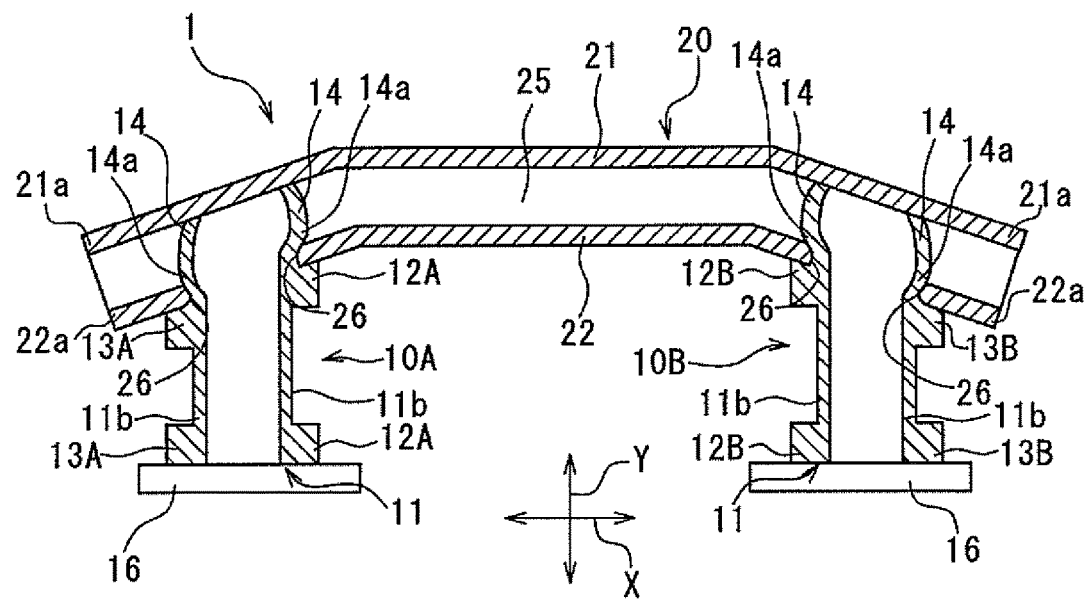
FIG. 15 is a sectional view taken in the same manner as FIG. 13 illustrating a modification of the second embodiment.

FIG. 15 shows a modification in which each of the bumper stays 10A, 10B includes a mounting plate 16 at their rear ends in the Y-direction for attaching the bumper reinforcement 1 to the vehicle body. The bumper stays 10A, 10B respectively have the inward protrusions 12A, 12B and the outward protrusions 13A, 13B near the contact portions where the bumper stays 10A, 10B are in contact with bumper beam 20 and near the mounting plates 16, but do not have the inward protrusions 12A, 12B or the outward protrusions 13A, 13B at the other portions.

Figure 16:
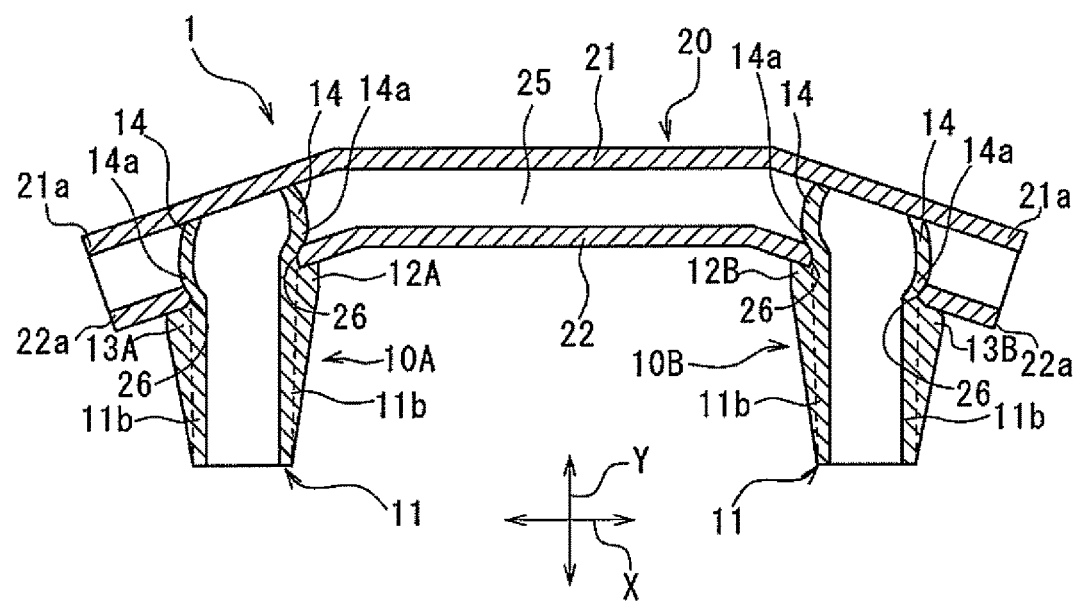
FIG. 16 is a sectional view taken in the same manner as FIG. 13 illustrating another modification of the second embodiment.

FIG. 16 shows a modification in which the amounts of protrusion of the inward protrusions 12A and 12B and the outward protrusions 13A, 13B when viewed from the Z-direction decrease from the front side to the rear side in the Y-direction.

Third Embodiment

A third embodiment of the present invention will be described with reference to FIG. 17.

Figure 17:
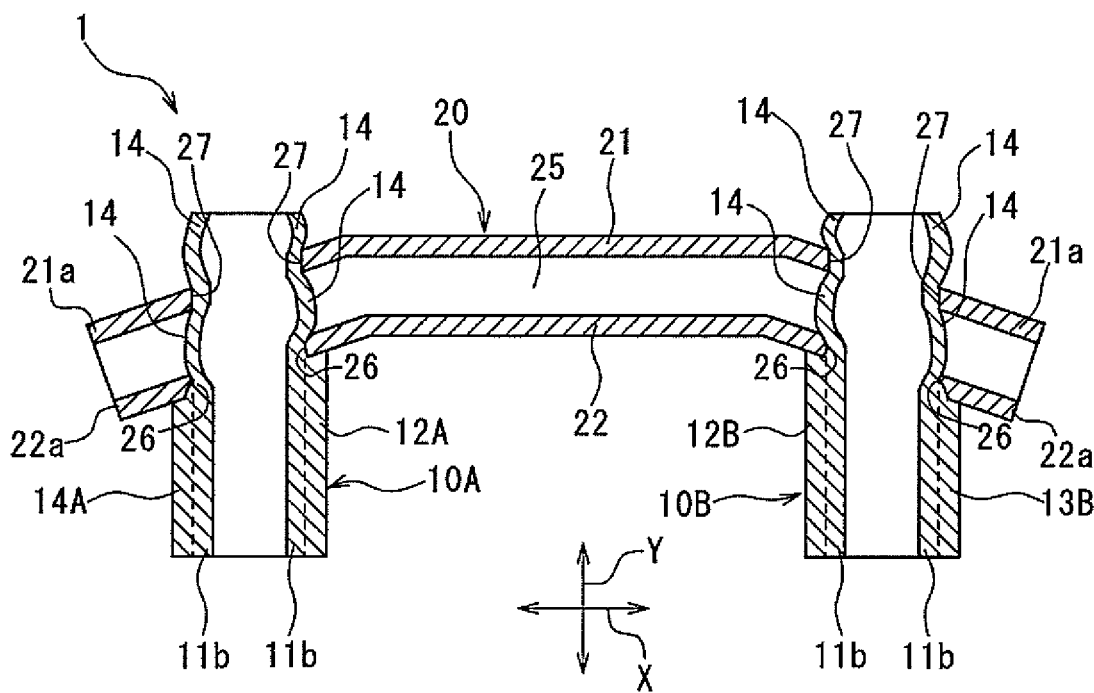
FIG. 17 is a sectional view of a vehicular structure according to a third embodiment, taken in the same manner as FIG. 2.

Referring to FIG. 17, the bumper stays 10A, 10B penetrate the bumper beam 20. Each of the bumper stays 10A, 10B has a flat surface perpendicular to the Y-direction at both ends thereof. Each of the front inclined-portions 21a of the bumper beam 20 includes a hole 27 that is concentric with and has the same shape as a corresponding one of the holes 26 of the rear inclined-portions 22a. The bumper stays 10A, 10B are respectively inserted in the holes 26 of the rear inclined-portions 22a and in the holes 27 of the front inclined-portions 21a of the bumper beam 20. The outer wall unit 11 of each of the bumper stays 10A, 10B includes swelling portions 14 formed inside the space 25 and on the front side in the Y-direction of the bumper beam 20.

Hereinafter, a method for forming the bumper reinforcement 1 according to the present embodiment will be described with reference to FIGS. 18 to 20.

Figure 18:
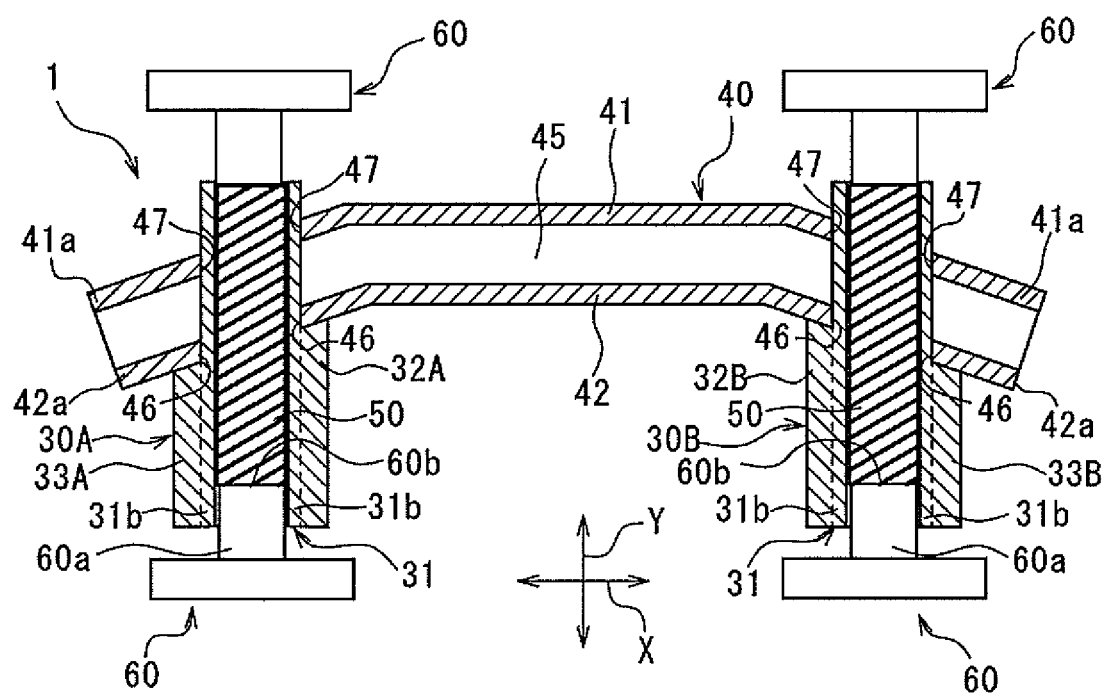
FIG. 18 is a sectional view taken in the same manner as FIG. 17 illustrating a first step of joining members according to the third embodiment.

Referring to FIG. 18, each of the first structural members 30A, 30B has at both ends thereof flat surfaces perpendicular to the Y-direction. The second structural member 40 includes at each of their front inclined-portions 41a a hole 47 that is concentric with and has the same shape as a corresponding one of the holes 46 of the rear inclined-portions 42a. The first structural members 30A, 30B are respectively inserted in the holes 46 of the rear inclined-portions 42a, and then in the holes 47 of the front inclined-portions 41a of the second structural member 40. Each of the rubber members 50 has flat surfaces perpendicular to the Y-direction at both ends thereof. The pressers 60 are disposed corresponding to either end of the first structural members 30A, 30B. That is, two pressers 60 are used for each one of the first structural members 30A, 30B.

Figure 19:
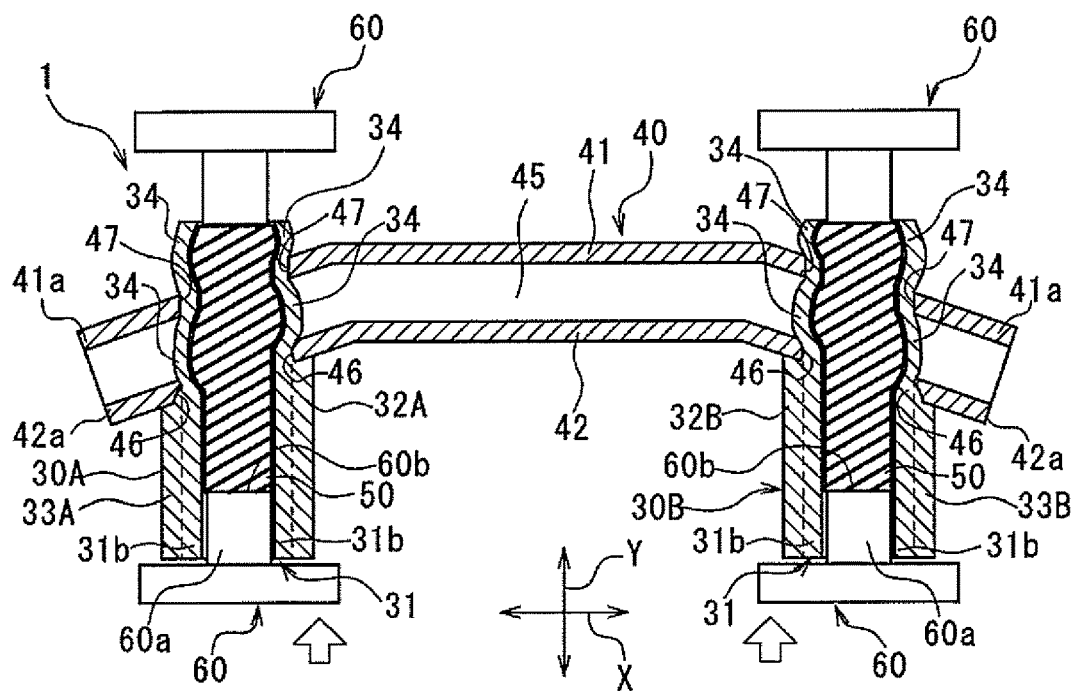
FIG. 19 is a sectional view taken in the same manner as FIG. 17 illustrating a second step of joining the members according to the third embodiment.

As shown in FIG. 19, in a crimping step according to the present embodiment, the pressers 60 on one side are fixed and the pressers 60 on the other side are inserted in the respective first structural members 30A, 30B from one end of each of first structural members 30A, 30B. Then, the pressers 60 compress the respective rubber members 50 in the Y-direction so that rubber members 50 expand in a direction orthogonal to the compression direction, thereby expanding the outer wall unit 31 of each of the first structural members 30A, 30B. The outer wall unit 31 of each of the first structural members 30A, 30B is expanded and crimped to the two holes 46, 47 of the second structural member 40. Accordingly, each one of the first structural members 30A, 30B is crimped to the second structural member 40 at at least two places (i.e., two holes 46, 47) in the present embodiment.

Figure 20:
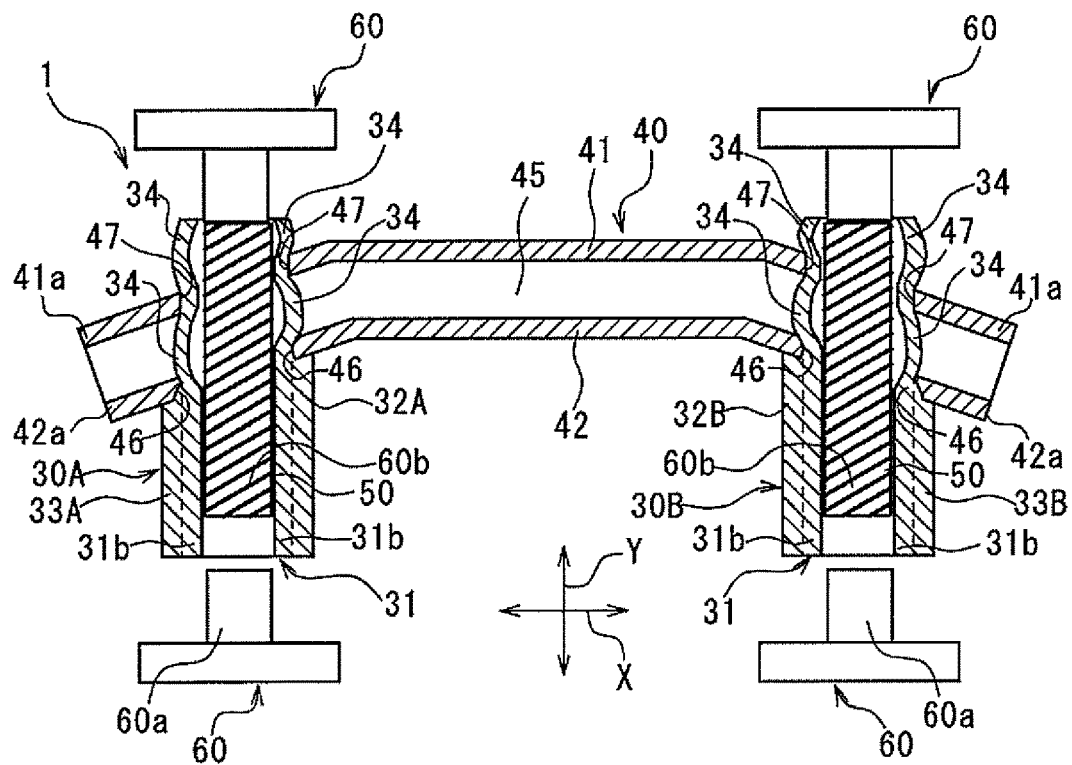
FIG. 20 is a sectional view taken in the same manner as FIG. 17 illustrating a third step of joining the members according to the third embodiment.

As shown in FIG. 20, compression by the pressers 60 is released after crimping. The rubber members 50 that have been released from a compression force are restored to their original shapes by their own elasticity. Therefore, the rubber members 50 can be easily removed from the first structural members 30A, 30B.

According to the present embodiment, a through hole penetrating the bumper beam 20 can be formed when the holes 26 and 27 are formed in the bumper beam 20. In view of a machining process, forming a through hole is easy as compared with forming a halfway hole (or a half through-hole). In addition, since each of the first structural members 30A, 30B penetrates the second structural member 40, the rubber members 50 can be inserted from either end of each of the first structural members 30A, 30B, thereby increasing advantages as compared with the configuration according to the first embodiment. In addition, each of the first structural members 30A, 30B is crimped to the second structural member 40 at two places, thereby enhancing the joining strength as compared with the configurations of the above described other embodiments.

The present invention has been described above with reference to the preferred embodiments, but the present invention is not limited to the specific embodiments, and various modifications can be made within the scope of the subject matter of the present invention described in the claims.

For example, the inward protrusions, the outward protrusions, and the vertical protrusions may be formed separately from the bumper stays.

The cross-sectional shape of each bumper stay is not limited to a rectangle or a circle, and may also be, for example, a polygon.

In addition, one bumper stay may include two or more inward protrusions, two or more outward protrusions, and two or more vertical protrusions.

The bumper beam is not limited to a steel material, such as a high-tensile-strength steel, and may be made of, for example, an aluminum alloy. That is, both the bumper beam and the bumper stays may be made of an aluminum material.

The invention claimed is:

1. A vehicular structure comprising:
   a first member formed in a tubular shape and having a protrusion on an outer periphery thereof; and
   a second member formed in a tubular shape and having a locking wall with a hole in which the first member is inserted,
   wherein the first member is expanded at a portion thereof inserted in the hole of the second member and joined to the second member, and
   wherein the protrusion is in contact with the locking wall of the second member.

2. The vehicular structure according to claim 1, wherein the hole penetrates the locking wall in a direction intersecting a longitudinal direction of the second member, and
   wherein the protrusion protrudes in the longitudinal direction.

3. The vehicular structure according to claim 1,
   wherein the protrusion extends in an axial direction of the first member.

4. The vehicular structure according to claim 3,
   wherein a protruded amount of the protrusion has distribution in the axial direction of the first member of the protrusion.

5. The vehicular structure according to claim 1,
   wherein the first member is a bumper stay for a vehicle, and the second member is a bumper beam for a vehicle.

6. The vehicular structure according to claim 1,
   wherein each of the first member and the second member is made of an aluminum material.

7. The vehicular structure according to claim 1,
   wherein a material of the first member is different from a material of the second member.

8. The vehicular structure according to claim 7,
   wherein the first member is made of an aluminum material, and the second member is made of a steel material.

9. The vehicular structure according to claim 2,
   wherein the first member is a bumper stay for a vehicle, and the second member is a bumper beam for a vehicle.

10. The vehicular structure according to claim 2,
    wherein each of the first member and the second member is made of an aluminum material.

11. The vehicular structure according to claim 2,
    wherein a material of the first member is different from a material of the second member.

12. The vehicular structure according to claim 11,
    wherein the first member is made of an aluminum material, and the second member is made of a steel material.

* * * * *